April 8, 1930.  W. H. KLOCKE  1,753,435
METHOD OF MAKING LINED BEARINGS
Filed Jan. 9, 1928

INVENTOR.
William H. Klocke
BY
Fay, Oberlin & Fay
ATTORNEYS.

Patented Apr. 8, 1930

1,753,435

UNITED STATES PATENT OFFICE

WILLIAM H. KLOCKE, OF WOODHAVEN, NEW YORK, ASSIGNOR TO THE CLEVELAND GRAPHITE BRONZE COMPANY, OF CLEVELAND, OHIO, A CORPORATION OF OHIO

METHOD OF MAKING LINED BEARINGS

Application filed January 9, 1928. Serial No. 245,314.

The present invention, relating, as indicated, to bearings and to a method of making same, is particularly directed to a lined steel back bearing and to a new and economical method of making same from strip stock, including the lining of the strip with the bearing metal. A further object of the invention is the provision of a bearing provided with an extremely tenacious bond between the back of the material and bearing metal.

To the accomplishment of the foregoing and related ends, said invention, then, consists of the means hereinafter fully described and particularly pointed out in the claims; the annexed drawing and the following description setting forth in detail one method and one product exemplifying my invention, such disclosed procedure and product constituting, however, but one of various applications of the principle of my invention.

In said annexed drawing:—

Figure 1:
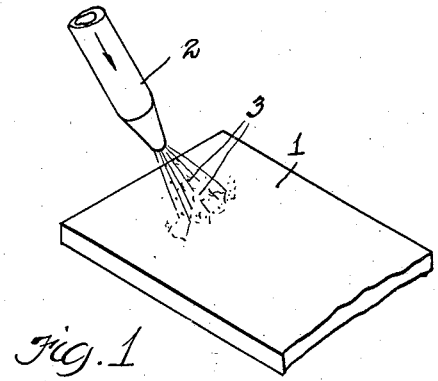
Figure 2:
Figure 3:
Figure 4:
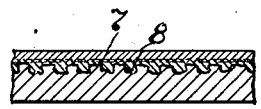
Figure 5:
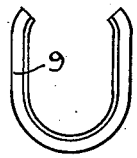
Figure 6:
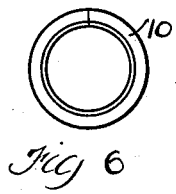
Figure 7:
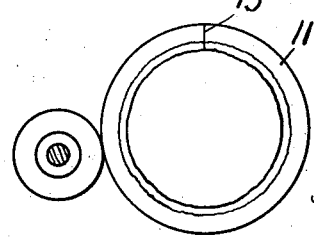
Figure 8:
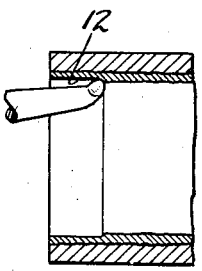

Fig. 1 is a view in perspective illustrating my improved method of preparing the strip for the reception of the bearing metal; Fig. 2 is a transverse section through the strip after preparation; Fig. 3 is a similar view showing the strip after being tinned; Fig. 4 is a similar view showing the strip after the application of the bearing metal over the surface of the tin; Fig. 5 is a view of a blank cut from the strip and partially formed; Fig. 6 is a similar view showing the formed cylindrical shell; Fig. 7 is a view showing the shell while in process of being ground over its entire surface; and Fig. 8 is a longitudinal section showing the machining of the inner surface of the shell.

The application of a bearing metal, such as Babbitt, to a bronze backing is very easily effected by reason of the affinity between the lining metal and the bronze, but in the application of babbitt, for example, to a backing such as steel, it is difficult to secure an effective bond between the two metals in the ordinary manner. I have found that an even more effective bond than is secured with bronze backing may be secured either on bronze, steel, or other metals, provided the surface area of the backing strip be increased and made irregular so that there is an actual interlocking between the metal of the bearing composition and the metal of the backing.

This increase in the surface area of the backing can be secured in various ways, but I have found the most effective to consist in blasting finally divided particles against the surface of the strip, as illustrated in Fig. 1. The strip 1 is passed beneath the nozzles 2, through which particles 3 of sharp, hard abrasive material are blown with air or in any other suitable manner to produce a uniformly pitted surface in the strip, the character of which is shown in Fig. 2. The action of the abrasive particles on the strip is to dig out a number of recesses 4, more or less uniformly distributed all over the surface of the strip, which are irregular in shape and which are provided with a number of re-entrant side walls 5, into which the metal which is to be cast thereagainst has an opportunity to actually interlock or engage, which greatly increases the strength and effectiveness of the bond between the metals.

After the flat strip stock has been blasted to increase the surface area and to produce the re-entrant recesses described above molten tin may be applied over the surface of the strip in any suitable manner producing a lining 6 on the strip, as shown in Fig. 3. The tin enters all of the minute irregularities in the strip 1, becoming locked thereto while the increased area of the strip available for the bond is increased by the blasting from 15% to 30%, depending upon the duration and intensity of the operation. After the application of the tin any suitable bearing alloy, such as babbitt, is cast against the tin surface, producing a lining 7, which may be formed relatively smooth and which alloys with the tin, forming an intermediate layer 8 which is an alloy of tin and babbitt. The bond which is thus secured between the babbitt and the steel back has been found extremely tenacious, and is such that the lined strip may be formed in practically any desired shape, without causing any breaking away of the bearing metal from the supporting strip.

By reason of this tenacious bond between the metals it is then possible to cut rectangular blocks from the strip, form these first into an open U-shaped element 9, as shown in Fig. 5, and then into cylindrical shells 10, shown in Fig. 6.

A shell 10 formed as desired is composed of layers of steel and babbitt of relatively uniform thickness and has its inner and outer surfaces relatively concentric. It is thus possible by a centerless grinding operation, illustrated in Fig. 7, to first grind smooth the outer surface 11 of the shell and at the same time to subsequently secure a very much higher degree of concentricity between the ground outer surface and the inner surface than is possible where the shell is chucked or mounted upon a mandrel. Either of these operations produces slight distortion at various points in the shell even when the shell is mounted with perfect concentricity on the chuck or mandrel, and this distortion prevents the securing of true concentricity between the ground outer surface of the shell and the inner lining, causing increased scrap losses in the subsequent machining operations on the lining and making it more difficult to hold the bearings to the accurate inside and outside limits which are required. In the centerless grinding operation there is no distortion of the shell and no internal pressure is applied tending to distort or open it any time during the operation. On the contrary, the forces acting on the shell tend to maintain it in its true cylindrical condition, and since there is no possibility of inaccurate centering as when mounted on a mandrel or in a chuck the removal of a minimum of material only is necessary, in order to bring it to a true smooth condition. After the outer surface has been brought to the proper condition the shell may be chucked and then turned internally, as shown in Fig. 8, to produce the desired internal surface 12, which is thus made accurately concentric with the outer surface 11.

The foregoing method of making lined bearings is extremely economical since it employs the least expensive initial material, that is, strip stock, while the method described of applying the bearing metal thereto produces such a tenacious bond between babbitt and steel that the lined strip may be cut and formed without affecting this bond. The use of the centerless grinding operation eliminates material scrap losses and permits an extremely accurate concentricity to be secured between inner and outer surfaces of the final bearings. The particular combination of steps described make it possible to eliminate many of the steps heretofore employed in the making of lined bearings from tubing while producing a very much superior article, both as regards concentricity and the strength of the bond between the bearing metal and the backing metal.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a method of making lined bearings, the steps which consist in subjecting a strip of sheet metal to a percussive action to produce a multiplicity of minute irregular recesses therein, tinning said surface, and then casting a bearing material capable of alloying with tin over the tinned surface of said strip.

2. In a method of making lined bearings, the steps which consist in subjecting one surface of a strip of sheet metal to a percussive action to produce a multiplicity of minute recesses therein having an aggregate area exceeding the superficial area of said surface by a considerable amount, then casting a thin layer of a material capable of alloying with the final bearing material all over the recessed surface of said strip and finally casting a bearing material against such prepared surface of said strip, thereby producing a mechanical and integral bond between the bearing material and the metal of said strip.

3. In a method of making lined bearings, the steps which consist in subjecting one surface of a strip of sheet metal to a percussive action to produce a multiplicity of minute irregular recesses therein provided with re-entrant lateral surfaces, casting a bearing material over the recessed surface of said strip to produce an integral and mechanical bond between bearing metal and the metal of said strip capable of withstanding breakage when said strip is bent and formed into cylindrical shape.

4. In a method of making lined bearings, the steps which consist in forming into a cylindrical bearing a strip of rolled sheet metal provided with a layer of bearing metal integrally and mechanically bonded to one surface thereof, grinding said resulting shell in a centerless grinding apparatus to produce a true smooth cylindrical outer surface and then machining the inner surface while locating from the previously formed true outer surface to produce concentric inner and outer surfaces in said shell.

Signed by me, this 3rd day of January, 1928.

WILLIAM H. KLOCKE.